United States Patent [19]

Huber et al.

[11] 4,026,315

[45] May 31, 1977

[54] VENTILATION SYSTEM FOR ROTATING WATER FEEDS

[75] Inventors: Albert Huber, Moriken; Reinhard Hürlimann, Zurich, both of Switzerland

[73] Assignee: BBC Brown Boveri & Company Limited, Baden, Switzerland

[22] Filed: Feb. 19, 1976

[21] Appl. No.: 659,564

[30] Foreign Application Priority Data

Apr. 8, 1975 Switzerland .................. 4425/75

[52] U.S. Cl. .................. 137/171; 165/40; 165/86; 165/103; 165/66
[51] Int. Cl.² .................. F28D 11/02
[58] Field of Search .............. 137/171; 165/40, 86, 165/110, DIG. 22, 66, 103

[56] References Cited

UNITED STATES PATENTS

| 3,345,803 | 10/1967 | Smith | 137/171 X |
| 3,791,167 | 2/1974 | Eskeli | 165/86 |

*Primary Examiner*—Alan Cohan
*Attorney, Agent, or Firm*—Toren, McGeady and Stanger

[57] ABSTRACT

A ventilation system for rotating water feeds particularly useful in water-cooled generators is equipped with bypass means arranged to extend between coaxial feed duct means and discharge duct means defining a centrally located axis of rotation. The bypass means includes at least one inlet which is located to open in the space around the axis of rotation with outlet means of the bypass means opening into the discharge duct means to vent air or gas bubbles.

8 Claims, 5 Drawing Figures

VENTILATION SYSTEM FOR ROTATING WATER FEEDS

BACKGROUND OF THE INVENTION

The present invention relates generally to rotating water feeds and more particularly to a ventilation system therefor. The invention is particularly useful in connection with water-cooled generators which preferably comprise coaxial feed and discharge ducts.

Prior to initiating operation of a rotating water feed, special attention must be paid to the elimination of air which may be enclosed in the cooling system in order to avoid undesired local overheating. Such overheating will give rise to several consequences including the formation of steam bubbles which may partly or possibly completely clog the respective cross sections of the flow paths involved. It is important for the proper ventilation of such a cooling system that not only stationary apparatus and auxiliary devices be ventilated, but rotating parts, particularly the water feeds, must also be ventilated. In the case of a rotating machine, it must be noted that the point of lowest pressure is usually at the axis of rotation. Consequently, any air or gas bubbles which remain in the circuit or which have entered through manipulation of the apparatus by operating personnel, will usually accumulate at this point. Despite the fact that these air bubbles will partially block the cross section of the flow paths involved and thereby reduce the efficiency of the cooling system practically no attention is paid to them. For example, in an article entitled "The Development of Water-Cooled Rotors for Large Turbogenerators" in "Technische Mitteilungen AEG Telefunken" 59 (1969), 1, there are described and represented only turbogenerators having no ventilation system.

In "AIEE Transactions" 1950, vol. 69, page 167–170, there are described and presented a few examples of water-cooled turborotors. In a stationary water feed pipe there is arranged a long, thin pipe extending in the axis of rotation. One end of the pipe is located in the branch point of the cooling waterconnections and the other end extends to the exterior of the machine. This solution, however, has been found to require considerable engineering effort due to the fact that these feeds must involve a great length in most of the cases where they are used.

Accordingly, it is an object of the present invention to provide an arrangement which avoids disadvantages of prior art techniques and which permits automatic removal, or reduction thereof to a tolerable extent, of air or gas bubbles accumulating in rotating pipes such as water feeds of water-cooled generators. It is also an aim of the invention to formulate a structural arrangement which is as simple in design as possible.

SUMMARY OF THE INVENTION

Briefly, the problems discussed above are solved by the present invention in a device of the aforementioned type by providing at least one bypass having at least one inlet and at least one outlet arranged between the feed duct and the discharge duct of the apparatus with the bypass having at least one inlet which opens into the space around the axis of rotation of the apparatus.

The advantages of the invention arise particularly because of the fact that by virtue of the aforementioned arrangement all bubbles will be rapidly and completely removed by utilizing the pressure gradient between the inflow and outflow for automatic operation of the device. Furthermore, the invention provides a ventilation system which is relatively simple in its design and construction.

In accordance with a preferred embodiment of the invention, the bypass is arranged in or on an end face of the feed ducts. This solution is of particular advantage if the branch point is at the end of the feed duct, because this point is usually the last point to which bubbles will be carried by a rotating rotor. If cooling water inlets are distributed over the entire length of a central bore, it is advantageous if the bypass is designed as a radially arranged pipe member with at least one inlet in the space around the axis of rotation. Of course, it is also possible to provide several bypasses in accordance with the structural solution of the present invention.

In accordance with a further embodiment of the invention, the bypass may be designed as a coiled pipe having at least one inlet opening into the space around the axis of rotation. This form of construction affords advantages in that it permits the amount of leakage and bypass to be minimized by simple technical means.

According to a preferred embodiment of the invention, the bypass is structured to include means for increasing the hydrodynamic resistance of flow through the bypass. Such an arrangement enables the achievement of an adequate pressure drop over a short distance with a low resistance to flow and, accordingly, a ventilation system having smaller outer dimensions may be provided.

The various features of novelty which characterize the invention are pointed out with particularity in the claims annexed to and forming a part of this disclosure. For a betterunderstanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
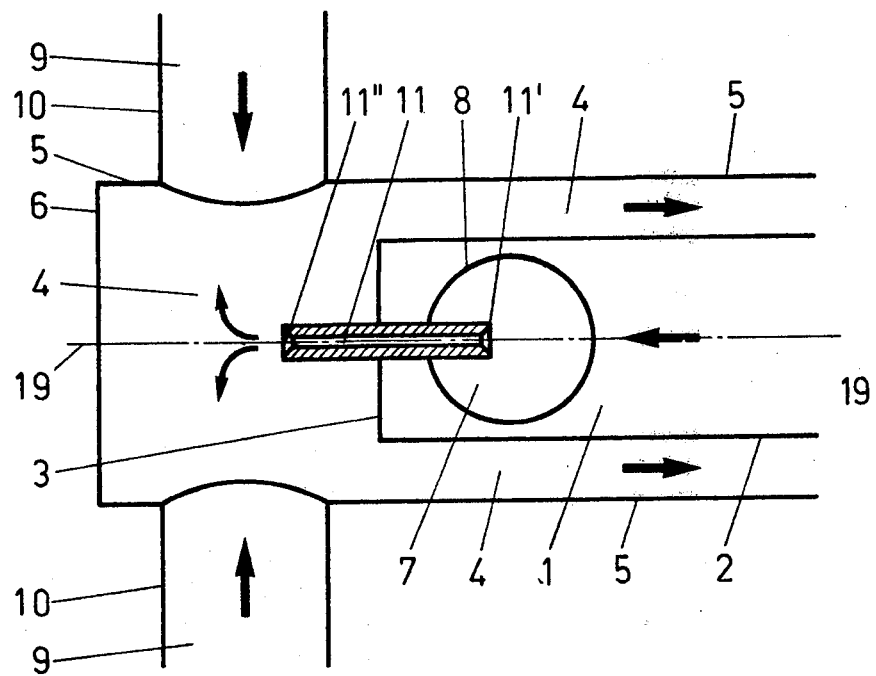
FIG. 1 is a schematic view partially in section depicting a first embodiment of the invention wherein the bypass means is arranged in the end face of the feed pipe.

Referring now to the drawings, wherein like reference numerals refer to similar parts throughout the various figures thereof, there is depicted in FIG. 1 a ventilation system for a rotating water feed which comprises an axial feed duct 1, defined by an inner pipe 2 having an end face 3. An axial discharge duct 4 is defined by an outer or outlet pipe 5 having an end face 6. The system includes a radial feed duct 7 defined by a radial feed pipe 8 with radial discharge ducts 9 being defined by radial discharge pipes 10. The bypass means of the invention are embodied in a bypass 11 which includes an inlet 11' and an outlet 11''. The system defines an axis of rotation designated 19 and the arrows shown in the drawing depict the directions of flow, with the smaller arrows representing the flow which occurs through the bypasses.

Figure 2:
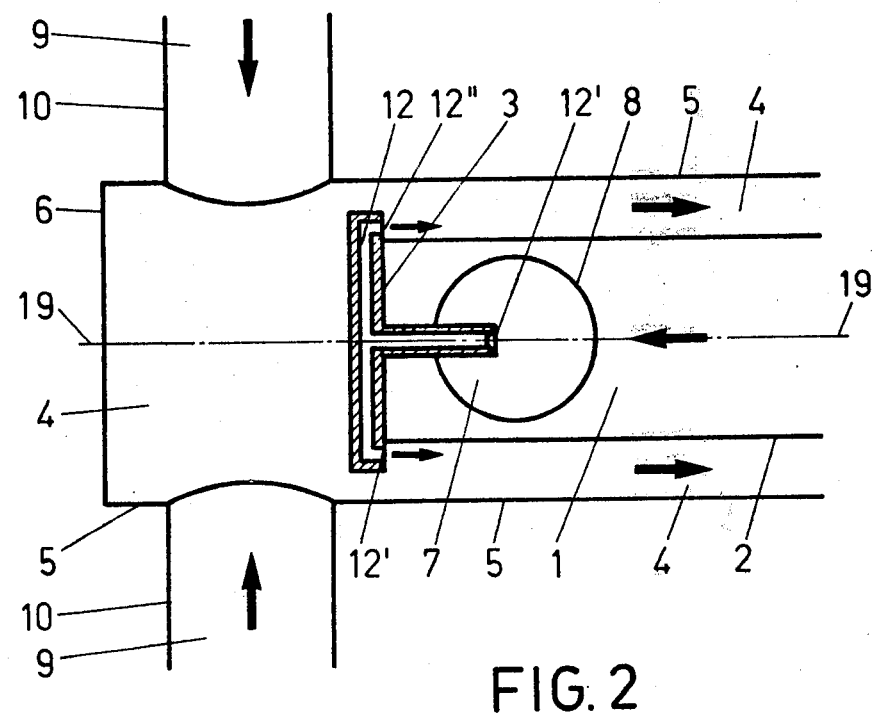
FIG. 2 is a schematic view partially in section showing a second embodiment of the invention wherein the bypass is arranged in the end face of the feed pipe.

In FIG. 2 a second embodiment of the invention is depicted as comprising a bypass member 12 having an inlet 12' and outlets 12''.

Figure 3:
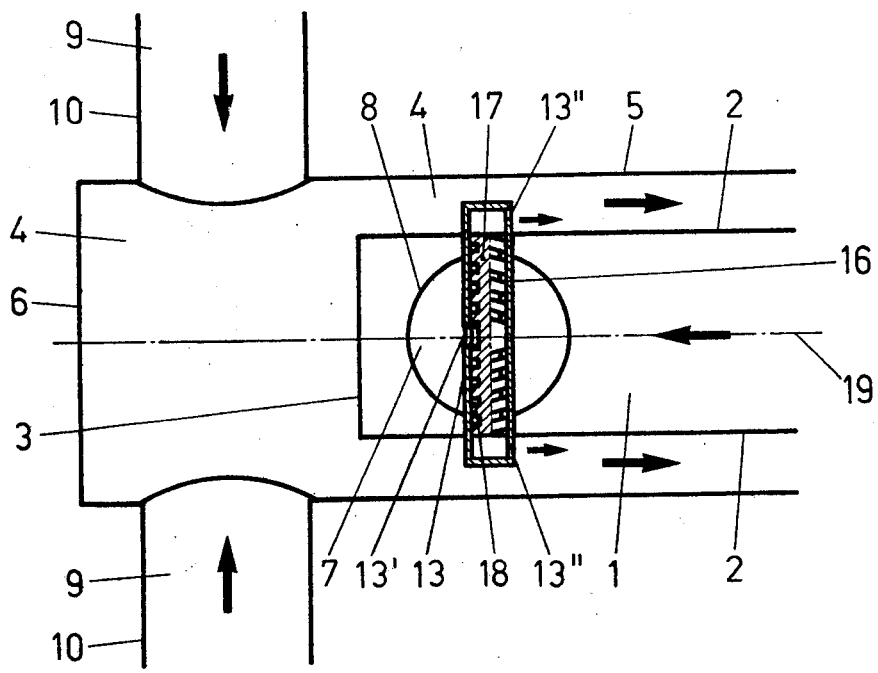
FIG. 3 depicts a third embodiment of the invention wherein the bypass is designed as a radially arranged pipe.

In FIG. 3 the bypass is shown at 13 with an inlet 13' and with outlets 13''. The pipe member forming the bypass 13 is shown at 16 and includes an insert 17 having a spiral groove provided therein in order to form through the bypass a spiral flow path.

Figure 4:
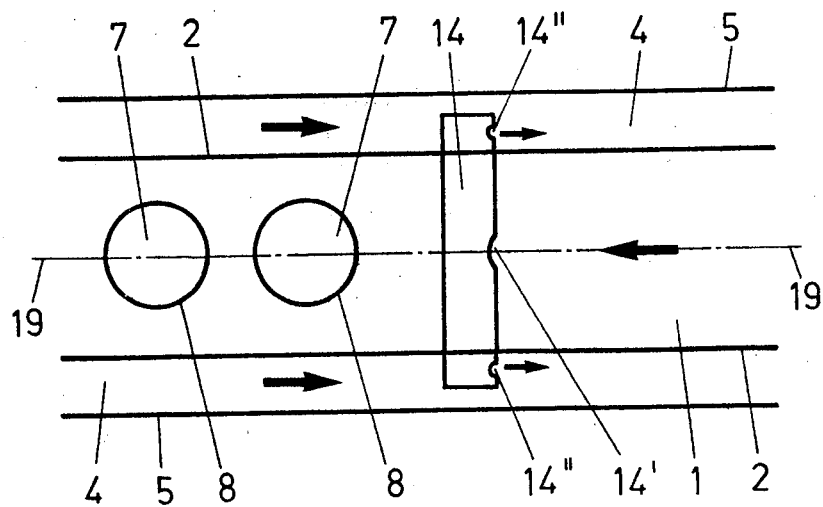
FIG. 4 shows a fourth embodiment of the invention wherein the bypass in again designed as a radial pipe.

In FIG. 4, the bypass means is identified as a bypass 14 having an inlet 14' and outlets 14''.

Figure 5:
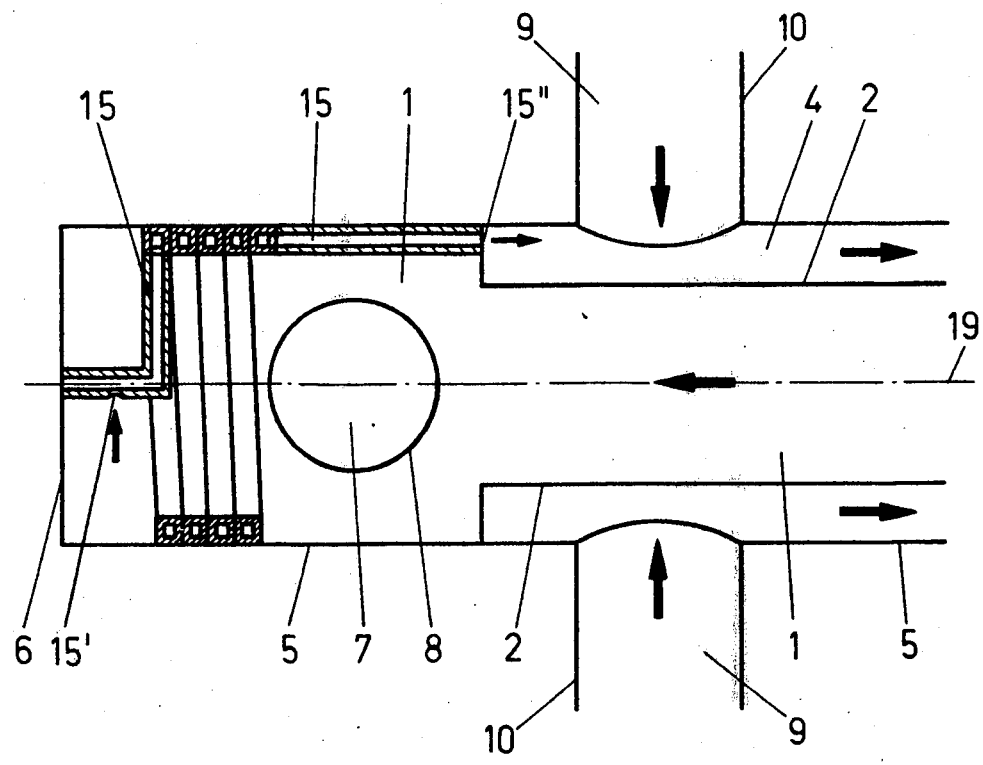
FIG. 5 depicts a fifth embodiment of the invention wherein the bypass is in the form of a coiled pipe.

In accordance with FIG. 5, the bypass is designated 15 and it includes an inlet 15' and an outlet 15''.

As shown in FIG. 1, the inner pipe 2 forming the axial feed duct 1 is provided with an end face 3. Adjacent the end face 3 there are arranged the radial feed ducts 7 which are formed by the radial feed pipes 8. The bypass 11 is arranged on the axis of rotation 19 with its outlet 11'' opening into the axial feed duct 4. As a result of the different pressures occurring in the feed duct 1 and in the discharge duct 4, air bubbles accumulating around the axis of rotation 19 will be transported through the bypass 11 into the discharge duct 4.

FIG. 2 depicts a similar arrangement of feed duct and discharge duct with the bypass 12, however, being designed in the form of a T-pipe. The radially extending portions of the T-pipe of the bypass 12 are formed to be longer than the diameter of the inner pipe 2 and as a result the outlets 12'' of the bypass 12 will open into the discharge duct 4 in the direction of flow.

FIG. 3 depicts a bypass 13 which is designed as a radially arranged pipe 16. The inlet opening 13 is again located in the space around the axis of rotation 19 and the outlets 13' open into the discharge duct 4 in the direction of flow. In order to increase the hydrodynamic resistance within the bypass, the pipe 16 includes the insert 17 having a spiral groove 18. This creates a throttling effect and the throttling device shown serves to minimize the amount of bypass flow.

The bypass 14 shown in FIG. 4 involves essentially the same design as the bypass 13 depicted in FIG. 3. However, in FIG. 4 the bypass 14 is arranged at any desired point of the inner pipe 2, this arrangement being suitable for a case where several radial feed ducts 7 open into the axial feed duct 1. In this embodiment it is possible to arrange several bypasses 14 in the inner pipe 2.

The embodiment of FIG. 5 depicts another structural arrangement for the feed duct 1 and the discharge duct 4. In the embodiment of FIG. 5, the bypass 15 is arranged at one end of the outer pipe 5. The bypass is designed in the form of a coiled pipe having its inlet 15' opening once again into the space around the axis of rotation 19. The bypass 15 may, of course, be provided with several inlets 15'. The spiral pipe of the bypass 15 is rather long and thus it will inherently act as a throttle. Of course, the bypass 15 can also be arranged in any cross section of the inner pipe 2 but it may, as a result, reduce the useful flow cross section of the pipe 2.

With the ventilation system in accordance with the present invention as described above, there will result elimination of any air or gas bubbles that may be formed because the inlet openings are provided in the space around the axis of rotation 19 where the arriving air bubbles accumulate because of the existance of a lowest pressure point. Thus, the inlet of the bypass is advantageously arranged and enables bypass flow in a desired manner in order to achieve the advantageous ventilating effects of the invention.

While specific embodiments of the invention have been show and described in detail to illustrate the application of the inventive principles, it will be understood that the invention may be embodied otherwise without departing from such principles.

What is claimed is:
1. A ventilation system for rotating water feeds particularly for water-cooled generators comprising feed duct means and discharge duct means arranged coaxially relative to each other and defining an axis of rotation, and bypass means including at least one inlet and at least one outlet arranged between said feed duct means and said discharge duct means, with said at least one inlet of said bypass means opening in the space proximate said axis of rotation.

2. A system according to claim 1 wherein said feed duct means includes an end face and wherein said bypass means is arranged on said end face.

3. Apparatus according to claim 1 wherein said bypass means comprises a pipe extending axially along said axis of rotation.

4. A system according to claim 1 wherein said bypass means comprises pipe means arranged to extend radially relative to said axis of rotation.

5. Apparatus according to claim 1 wherein said bypass means comprises a helically coiled pipe extending about said axis of rotation.

6. Apparatus according to claim 1 wherein said bypass means comprises a pipe defining a T-shaped flow passage having a central inlet defined on a central leg of said T-shape and a pair of radially extending conduits terminating at a pair of outlets opening into said discharge duct means.

7. A system according to claim 1 wherein said bypass means includes means for increasing the hydrodynamic resistance to flow therethrough.

8. A system according to claim 7 wherein said means for increasing said hydrodynamic resistance comprise insert means located within said bypass means to define the flow passage therethrough in a spiral configuration.

* * * * *